United States Patent
Nagata

(10) Patent No.: US 10,703,655 B2
(45) Date of Patent: Jul. 7, 2020

(54) TOURMALINE TREATMENT DEVICE AND COOLING WATER CIRCULATION SYSTEM INCLUDING SAME

(71) Applicant: TOYOTA BOSHOKU KABUSHIKI KAISHA, Aichi (JP)

(72) Inventor: Masasuke Nagata, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/317,422

(22) PCT Filed: Jul. 24, 2017

(86) PCT No.: PCT/JP2017/026722
§ 371 (c)(1),
(2) Date: Jan. 11, 2019

(87) PCT Pub. No.: WO2018/021253
PCT Pub. Date: Feb. 1, 2018

(65) Prior Publication Data
US 2019/0248683 A1    Aug. 15, 2019

(30) Foreign Application Priority Data

Jul. 28, 2016   (JP) ................... 2016-148947

(51) Int. Cl.
*C02F 1/48* (2006.01)
*C02F 1/52* (2006.01)
(Continued)

(52) U.S. Cl.
CPC .................. *C02F 1/68* (2013.01); *C02F 1/48* (2013.01); *C02F 1/5236* (2013.01); *C02F 5/08* (2013.01);
(Continued)

(58) Field of Classification Search
CPC .. C02F 1/48; C02F 1/5236; C02F 1/58; C02F 5/08; C02F 2103/023; C02F 2301/046;
(Continued)

(56) References Cited

U.S. PATENT DOCUMENTS

2009/0166299 A1 * 7/2009 Takahashi .............. B01D 24/04
210/758

FOREIGN PATENT DOCUMENTS

JP           5-064787       3/1993
JP       10323516 A    * 12/1998
(Continued)

OTHER PUBLICATIONS

Machine translation of JP H10-323516 (1998) (obtained from Google Patents Sep. 2019) (Year: 1998).*

(Continued)

*Primary Examiner* — Lucas A Stelling
(74) *Attorney, Agent, or Firm* — Greenblum & Bernstein, P.L.C.

(57) ABSTRACT

The present tourmaline treatment device includes a housing, and a container disposed in the housing so as to partition the inside of the housing into an upstream space and a downstream space and contain tourmaline granules. The container includes an upstream partition wall facing the upstream space and a downstream partition wall facing the downstream space. The upstream partition wall is provided with a plurality of inflow holes for introducing cooling water into the container from the upstream space, and the downstream partition wall is provided with a plurality of outflow holes for allowing cooling water to flow out from the container into the downstream space. The container further includes flow velocity control means for increasing flow velocity of cooling water passing through the inside of the container.

6 Claims, 6 Drawing Sheets

(51) Int. Cl.
*C02F 1/68* (2006.01)
*C02F 5/08* (2006.01)
*F28G 13/00* (2006.01)
*C02F 103/02* (2006.01)

(52) U.S. Cl.
CPC ........ *F28G 13/00* (2013.01); *C02F 2103/023* (2013.01); *C02F 2301/046* (2013.01); *C02F 2301/066* (2013.01)

(58) Field of Classification Search
CPC . C02F 2301/066; C02F 2303/22; F28G 13/00
See application file for complete search history.

(56) References Cited

FOREIGN PATENT DOCUMENTS

| | | |
|---|---|---|
| JP | 2004-298708 | 10/2004 |
| JP | 2005-021979 | 1/2005 |
| JP | 2008-126224 | 6/2008 |
| JP | 2009-101259 | 5/2009 |
| JP | 3186275 | 9/2013 |

OTHER PUBLICATIONS

International Search Report in International Application No. PCT/JP2017/026722, dated Aug. 29, 2017.
Office Action issued in Japan Counterpart Patent Appl. No. 2016-148947, dated Dec. 3, 2019 (and with a drafting date of Nov. 26, 2019), along with an English translation thereof.

\* cited by examiner

TOURMALINE TREATMENT DEVICE AND COOLING WATER CIRCULATION SYSTEM INCLUDING SAME

TECHNICAL FIELD

The present invention relates to a tourmaline treatment device and a cooling water circulation system including the same, and more particularly to a tourmaline treatment device provided in a circulation path of cooling water and a cooling water circulation system including the same.

BACKGROUND ART

Conventionally, it is known that tourmaline is a silicate mineral having characteristics such as generating a permanent weak current, generating far infrared rays, and eluting minerals, and that these characteristics provide various useful benefits as shown below.

First, the tourmaline has a characteristic of permanently generating a weak current. The tourmaline is a polar crystal having a characteristic of holding an anode and a cathode naturally and permanently at respective ends of the crystal. This allows the anode of the tourmaline to have a characteristic of continuously and permanently generating a weak current of 0.06 milliamperes as follows: attracting and absorbing negative ions in the atmosphere; incorporating collected negative ions into the tourmaline; transmitting the negative ions to the cathode; and discharging remaining negative ions from the cathode. The characteristic of continuously and permanently generating the weak current provides a current collecting effect and a piezoelectric effect that are further enhanced by applying heat or pressure, thereby causing not only a large amount of static electricity to be generated, but also voltage to be increased. The tourmaline permanently forming an electric field as described above is generally called an "electric stone".

The characteristics as described above allow the tourmaline to have ability not only to instantaneously convert water into negative ions when exposed to water, but also to change the water to being weakly alkaline at the same time. That is, electrons stored in the cathode of the tourmaline are instantaneously discharged when exposed to water, and are electrolyzed into hydrogen ions and hydroxide ions. The hydrogen ions combine with water molecules to continuously generate supplies having a surface-active effect called "pidroxyl ions". These are negative ions. The water having passed through the processes as described above has a weak alkalinity showing PH 7.5 due to decrease in hydrogen ion.

Cooling circulating water in plants and the like contains chlorine, impurities, and the like, so that molecular activity is restricted and water molecules, each called H2O, are likely to become conjugates to exist as large clusters formed by causing many of the conjugates to gather, in many cases. When water with large clusters as described above is brought into contact with tourmaline, the clusters of the water are decomposed by voltage of the tourmaline. This causes the water to return to a normal molecular state to actively perform molecular activity, so that the water becomes "water with high permeability and water absorption, being smooth, and having a cleaning effect". This is activation of water.

Second, the tourmaline has a characteristic of radiating far infrared rays. The tourmaline has a physical property of causing pyroelectric phenomenon (pyroelectricity) of electrostatic charge caused by heat. It is said that effect of the physical property is doubled as temperature rises by 2 degrees. The tourmaline also has a physical property of causing piezoelectric phenomenon (piezo electricity) of electrostatic charge caused by even a slight shock. This pyroelectric and piezoelectric energy is considered as far infrared rays. That is, when heat or pressure is applied to the tourmaline, it is converted to far infrared rays with a wavelength of 4 to 14 microns, and the far infrared rays are radiated.

Third, the tourmaline has a characteristic of eluting minerals into water. From the tourmaline, elements such as magnesium, iron, boron, and silicon, contained in the tourmaline itself, are eluted into the water. This enables the water to be mineralized by putting the tourmaline into the water.

As described above, the tourmaline has the characteristics to perform various functions such as: generating negative ions to instantaneously convert water molecules into negative ions; changing the water to being weakly alkaline; and activating the water; radiating far infrared rays to produce a surface-active effect, thereby eluting minerals into the water. As a result, specifically, using the tourmaline achieves efficacy such as prevention of metal corrosion, prevention of scale adhesion, improvement in water quality, softening scale in a cooling circulation pipe, softening corrosion, cleaning effect, and water mineralization. Thus, the tourmaline can be used and applied in the field of water treatment of cooling circulating water.

Unfortunately, the tourmaline generates a weak current and a small electric field, so that it is difficult to remarkably obtain the action and effect of the tourmaline as described above by only bringing the tourmaline into contact with water, or by only bringing the tourmaline in contact with water instantaneously or for a short time. In addition, the tourmaline is a mass of hard rock, so that its handling is limited to cause its usage to be difficult. As a result, it is difficult to obtain the useful action and effect of the tourmaline, so that practical usage of the tourmaline is not yet realized at present.

Conventionally, there is proposed a technique of producing tourmaline-treated water by bringing water into contact with tourmaline (e.g., refer to Patent Literature 1). This proposed technique is merely to immerse the tourmaline in water by placing it on the bottom of a bathtub, or to bring water flowing through a pipe into contact with a container filled with tourmaline. The method of instantaneously bringing water and tourmaline into contact with each other, or the method of simply bringing water into contact with the tourmaline placed in a stationary manner, as described above, does not enable a large amount of water to be treated by a weak current. In addition, to obtain the tourmaline-treated water having developed action and effect of the tourmaline to the extent that the effect can be perceived, a certain level of improvement and contrivance is required.

CITATIONS LIST

Patent Literatures

Patent Literature 1: Japanese Unexamined Patent Application Publication No. H05-64787
Patent Literature 2: Japanese Unexamined Patent Application Publication No. 2005-21979
Patent Literature 3: Japanese Unexamined Patent Application Publication No. 2009-101259

SUMMARY OF INVENTION

Technical Problems

Patent Literature 2 above discloses a technique in which an activation chamber 54 is filled with countless fine electric stone (tourmaline) granules (refer to FIG. 1 of Patent Literature 2). The cooling water in the activation chamber 54 has a surface-active action due to an electrolysis reaction occurring between the electric stone granules serving as an electrode and the cooling water. It is described that the surface-active action is imparted to the cooling water introduced into the activation chamber 54 filled with the electric stone granules, so that the inside of a cooling water path of a mold is cleaned, thereby preventing scales and the like from adhering to the inside of the cooling water path to narrow or clog the inside of the cooling water path (refer to the paragraph [0027]).

Unfortunately, the technique disclosed in Patent Literature 2 is configured such that a water treatment device 50 includes a water storage tank 51 whose inside is divided into a plurality of portions, and such that circulating water passes through among the electric stone granules filled in a container disposed in a water tank according to the structure of the activation chamber 54. According to the illustration, the electric stone granules filled in the container obstruct the circulating water entering the activation chamber 54, so that most of the circulating water flows toward an upper portion of the container while bypassing the electric stone granules. Thus, it seems that the surface-active action cannot be imparted to the circulating water by only bringing the circulating water into contact with the electric stones in the activation chamber 54.

Patent Literature 3 above discloses a technique of introducing circulating water into a storage container through a water passing hole of the storage container to bring a water flow of the circulating water into contact with tourmaline carriers (refer to FIG. 2 of Patent Literature 3). It is described that the amount of the tourmaline carriers stacked in a thickness direction is small and water flow resistance in the storage container can be reduced, thereby enabling flow velocity of the circulating water to be increased to improve antifouling effect (refer to the paragraph [0006]). In addition, the tourmaline carriers 11 are each made of a ceramic ball having a surface layer containing tourmaline, and formed to have a diameter of 5 mm to 10 mm, for example (refer to the paragraph [0025]). The storage container 12 contains the tourmaline carriers 11 and allows the circulating water to pass therethrough. For example, the storage container 12 is formed in a flat rectangular parallelepiped shape having a width of 280 mm, a depth of 280 mm, and a thickness of 65 mm, composed of a wire mesh made of stainless steel (refer to the paragraph [0026]). When an antifouling device 10 is exposed to circulating water W flowing down to circulating water 25 and circulated, the circulating water W is introduced into the storage container 12 via the water passing hole 12c of the storage container 12. As a result, a water flow of the circulating water W is brought into contact with the tourmaline carriers 11. It is described that the technique causes not only electric charge to be generated on a surface of each of the tourmaline carriers 11 to promote ionization of the circulating water W, but also tourmaline to be eluted into the circulating water W to purify the circulating water W, thereby enabling prevention of erosion of a pipe, adhesion of scales such as silica, and occurrence algae and legionella bacteria (refer to the paragraph [0036]).

Unfortunately, the technique disclosed in Patent Literature 3 above causes the tourmaline carrier having a diameter of 5 mm to 10 mm to protrude from the storage container due to size of the storage container. Even if the storage containers are placed side by side in the water tank, circulating water flows in the direction causing less resistance, as long as the container is sealed and no circulating water is allowed to flow in the same direction. This causes contact area between water and tourmaline to decrease, so that it is difficult to generate the electric charge greatly. While circulating water passing an upper portion of the storage container has a high flow velocity, circulating water passing a lower portion of the storage container has a low flow velocity. This causes effective electric charge to occur only in a part of the total amount of tourmaline in the storage container.

Cooling tower circulation and chiller circulation used in factory facilities and the like cause the following problems due to deterioration in water quality of cooling water: adhesion, deposition, and clogging of a flow channel, of scales; corrosion, rust, and water leakage; and occurrence of slime and algae, in a mold cooling hole, a cooling pipe, a heat exchanger, and the like. As a result, the following various problems occurs: unstable quality of a molding (a mold cannot be maintained at a constant temperature, and a silver defect due to insufficient cooling is likely to occur): waste of electric power and energy (increase in power consumption due to deterioration in a heat exchange rate of a heat exchanger, increase in the amount of emission of $CO_2$, and increase of trouble about abnormal high pressure of a heat exchanger); and increase in facility management cost increase of electricity charges for facilities, increase of chemical cleaning cost, and increase of cleaning maintenance cost). Thus, there is desired the appearance of a cooling water circulation system capable of circulating cooling water improved in water quality.

The present invention is made in light of the above-described circumstances, and an object thereof is to provide a tourmaline treatment device capable of efficiently generating useful tourmaline-treated water by bringing cooling water into contact with tourmaline granules with strong pressure and impact, and a cooling water circulation system including the same.

Solutions to Problems

While acknowledging diverse functions of tourmaline, the present inventors have studied how to practically utilize the tourmaline to obtain action and effect whose usefulness can be perceived. As a result, the present inventors have found a method of utilizing the tourmaline to develop its characteristics at a maximum, the method being capable of: efficiently forming tourmaline-treated water improved in water quality acquired by bringing water into contact with tourmaline; utilizing the tourmaline-treated water conveniently; and developing action and effect of the tourmaline most efficiently. That is, the present inventors have focused on piezoelectric effect (piezo electricity) included in characteristics of the tourmaline, the piezoelectric effect generating an electric field on a surface of the tourmaline being subjected to pressure or impact. Then, it has been acknowledged that a water pressure of cooling water circulating for cooling is 0.3 MPa to 0.5 MPa, for example, higher than that of tap water (0.1 MPa), and that when the cooling water circulating under this high water pressure is brought into contact with the tourmaline with high pressure, useful tourmaline-treated water can be produced with high efficiency. Then, the present inventors have developed a tourmaline treatment device with a function capable of producing tourmaline-treated water by reducing increase in pressure loss, while utilizing the piezoelectric effect (piezoelectricity) as much as possible. As described above, the present invention has a feature of embodying a tourmaline treatment device that improves cooling water in water quality with high efficiency by bringing the cooling water into contact with tourmaline with high pressure to cause the tourmaline to develop the piezoelectric effect that is a characteristic of the tourmaline, thereby efficiently supplying current to the cooling water.

In order to solve the above problem, the invention as defined in claim 1 relates to a tourmaline treatment device provided in a circulation path of cooling water, the tourmaline treatment device comprising: a housing having an inflow port and an outflow port for cooling water; and a container disposed in the housing so as to partition the inside of the housing into an upstream space and a downstream space and contain tourmaline granules, the container including an upstream partition wall facing the upstream space and a downstream partition wall facing the downstream space, the upstream partition wall being provided with a plurality of inflow holes for introducing cooling water into the container from the upstream space, the downstream partition wall being provided with a plurality of outflow holes for allowing cooling water to flow out from the container into the downstream space, and the container further including flow velocity control means, or simply flow velocity control, for increasing flow velocity of cooling water passing through the inside of the container.

The invention as defined in claim 2 relates to the tourmaline treatment device according to claim 1, wherein the flow velocity control means is configured by setting an opening area of each of the plurality of inflow holes to be smaller than an opening area of each of the plurality of outflow holes.

The invention as defined in claim 3 relates to the tourmaline treatment device according to claim 1 or 2, wherein the flow velocity control means is configured by setting an opening rate of the plurality of inflow holes with respect to the upstream side partition wall to be smaller than an opening rate of the plurality of outflow holes with respect to the downstream side partition wall.

The invention as defined in claim 4 relates to the tourmaline treatment device according to any one of claims 1 to 3, wherein the housing is formed in a cylindrical shape, the upstream partition wall is formed in a cylindrical shape having a diameter smaller than that of the housing, the downstream partition wall is formed in a cylindrical shape having a diameter not only smaller than that of the housing, but also larger than that of the upstream partition wall, and the upstream partition wall and the downstream partition wall are disposed in the housing such that their axes align with an axis of the housing.

The invention as defined in claim 5 relates to the tourmaline treatment device according to claim 4, wherein the flow velocity control means is configured by setting a difference between an inner diameter of the housing and an outer diameter of the downstream partition wall to be smaller than a difference between an inner diameter of the downstream partition wall and an outer diameter of the upstream partition wall.

The invention as defined in claim 6 relates to the tourmaline treatment device according to claim 4 or 5, wherein the housing includes a housing body in a bottomed cylindrical shape that has an opening at one end side in its axial direction and in which the container is disposed, and a lid detachably attached to the housing body so as to cover the opening of the housing body.

In order to solve the above problem, the invention as defined in claim 7 relates to a cooling water circulation system for circulating cooling water in a circulation path, comprising the tourmaline treatment device according to any one of claims 1 to 6.

Advantageous Effects of Invention

The tourmaline treatment device of the present invention includes the housing having the inflow port and the outflow port for cooling water, and the container disposed in the housing so as to partition the inside of the housing into the upstream space and the downstream space to contain tourmaline granules; The container includes the upstream partition wall facing the upstream space and the downstream partition wall facing the downstream space. The upstream partition wall is provided with a plurality of inflow holes for allowing cooling water to flow into the container from the upstream space, and the downstream partition wall is provided with a plurality of outflow holes for allowing the cooling water to flow out from the inside of the container into the downstream space. The container further includes flow velocity control means for increasing flow velocity of cooling water passing through the inside of the container. This causes the cooling water flowing into the upstream space in the housing from the inflow port to flow into the container through the plurality of inflow holes of the upstream partition wall to pass through the inside of the container, or among the tourmaline granules. At this time, the flow velocity control means increases the flow velocity of the cooling water passing through the inside of the container. Thus, the cooling water is brought into contact with the tourmaline granules with a strong pressure and impact, so that the piezoelectric effect being the characteristic of the tourmaline is developed to efficiently produce useful tourmaline-treated water. Then, the cooling water having passed through the inside of the container flows out from the plurality of outflow holes of the downstream partition wall into the downstream space in the housing to flow out to the outside of the housing through the outflow port.

When the flow velocity control means is configured such that the plurality of inflow holes each has an opening area smaller than an opening area of each of the plurality of outflow holes, the cooling water in the upstream space passes through the inside of the container at a flow velocity increased when passing through the inflow holes each having a relatively small opening area. The cooling water having passed through the inside of the container passes through the outflow holes each having a relatively large opening area to reduce increase in pressure loss.

When the flow velocity control means is configured such that the upstream partition wall has an opening rate of the plurality of inflow holes, smaller than an opening rate of the plurality of outflow holes of the downstream partition wall, the cooling water in the upstream space passes through the inside of the container at a flow velocity increased when passing through the inflow holes each having a relatively small opening rate. The cooling water having passed through the inside of the container passes through the outflow holes each having a relatively large opening rate to reduce increase in pressure loss.

When the tourmaline treatment device is configures as follows: the housing is formed in a cylindrical shape; the upstream partition wall is formed in a cylindrical shape having a diameter smaller than that of the housing; the downstream partition wall is formed in a cylindrical shape having a diameter not only smaller than that of the housing, but also larger than that of the upstream partition wall; and the upstream partition wall and the downstream partition wall are disposed in the housing such that their axes align with an axis of the housing, the cooling water flowing into the upstream space in the container on its inner peripheral side flows through the inflow holes to flow in the container toward a centrifugal side. The cooling water having passed through the inside of the container flows through the outflow holes to flow out into the downstream space in the container on its outer peripheral side, and then hits a side wall of the housing to flow downward in the downstream space. This enables the cooling water to be brought into contact with the tourmaline granules with higher pressure and impact.

When the flow velocity control means is configured such that a difference between a inner diameter of the housing and an outer diameter of the downstream partition wall is smaller than a difference between an inner diameter of the downstream partition wall and an outer diameter of the upstream partition wall, the flow velocity of cooling water flowing downward in the downstream space is increased, thereby increasing flow velocity of cooling water flowing through the inside of the container.

When the housing includes a housing body in a bottomed cylindrical shape, and a lid attached to the housing body in a detachable manner, detaching the lid from the housing body enables the inside of the housing to be easily cleaned and checked, for example.

The cooling water circulation system of the present invention includes the tourmaline treatment device described above. This enables useful tourmaline-treated water to be efficiently produced by bringing the cooling water into contact with the tourmaline granules with high pressure and impact. Circulating cooling water improved in water quality through a circulation path enables not only contamination and clogging of the circulation path to be prevented, but also the water quality of the cooling water to be maintained.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5 is an explanatory view for illustrating an air vent valve of the tourmaline treatment device, in which FIG. 5(a) illustrates an ascending state of a float and FIG. 5(b) illustrates a descending state of the float (a state of exhausting air).

FIG. 9 is an explanatory view for illustrating a container of the tourmaline treatment device, in which FIG. 9(a) illustrates a partial surface of an upstream partition wall and FIG. 9(b) illustrates a partial surface of a downstream partition wall.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

DESCRIPTION OF EMBODIMENT

<Tourmaline Treatment Device>

Figure 2:
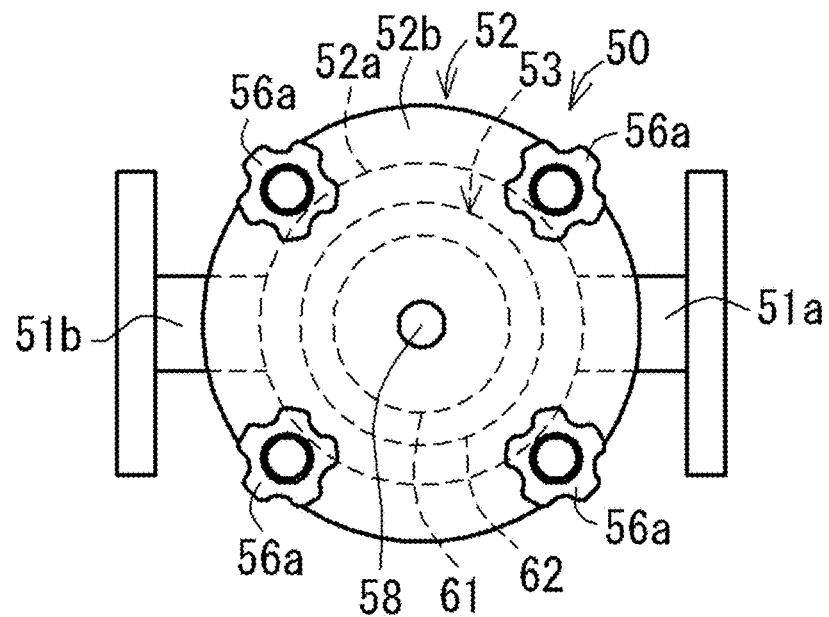
FIG. 2 is a plan view of a tourmaline treatment device according to an example.
Figure 3:
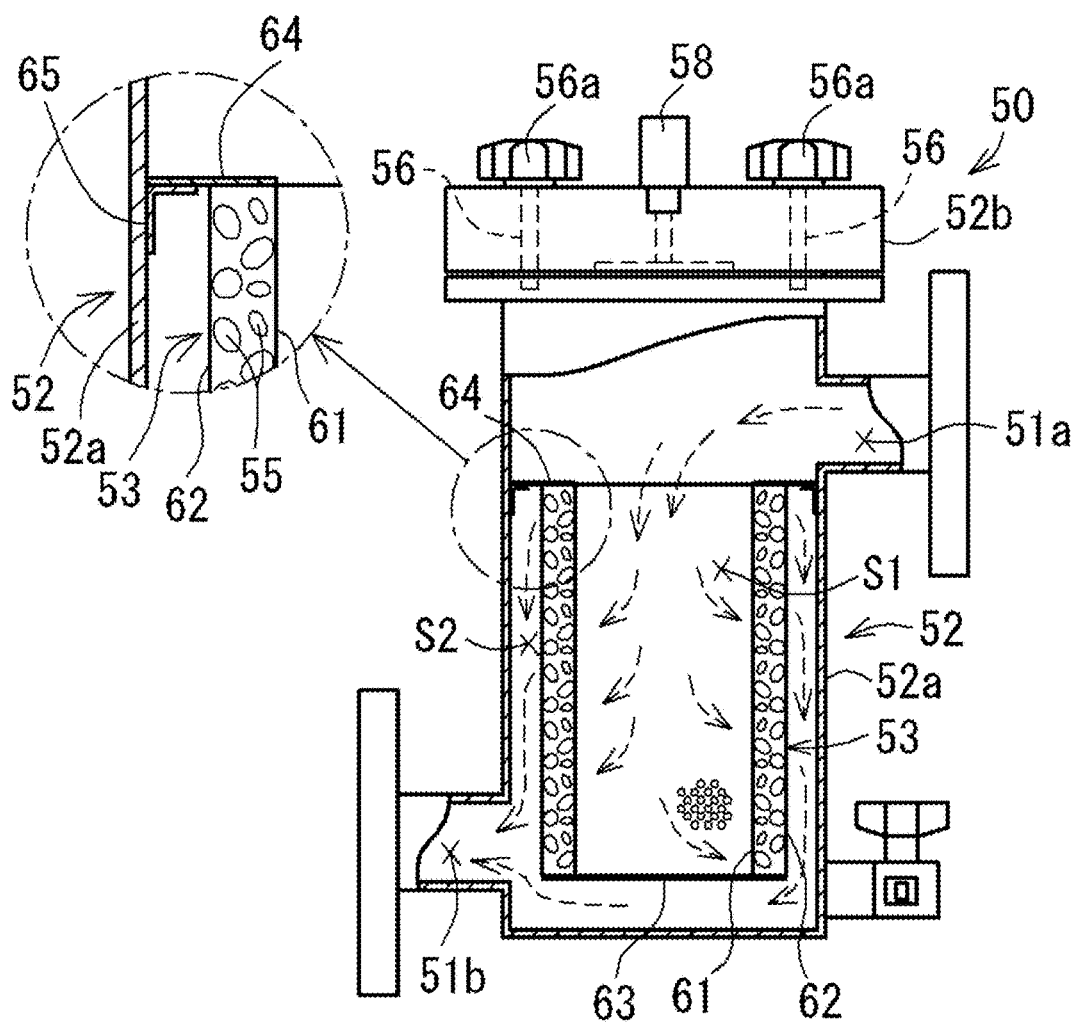
FIG. 3 is a side view of the tourmaline treatment device above, illustrating a main section of it as a sectional view.

A tourmaline treatment device according to the present embodiment is a tourmaline treatment device (50) provided in circulation paths (2 and 3) of cooling water, including a housing (52) having an inflow port (51a) and an outflow port (51b) for cooling water, and a container (53) that is disposed in the housing so as to partition the inside of the housing into an upstream space (S1) and a downstream space (S2), and that contains tourmaline granules (55) (e.g., refer to FIGS. 2 and 3). The container (53) includes an upstream partition wall (61) facing the upstream space (S1) and a downstream partition wall (62) facing the downstream space (S2). The upstream partition wall is provided with a plurality of inflow holes (61a) for introducing cooling water into the container from the upstream space, and the downstream partition wall is provided with a plurality of outflow holes (62a) for allowing cooling water to flow out from the container into the downstream space. The container (53) further includes flow velocity control means, or simply flow velocity control, for increasing flow velocity of cooling water passing through the inside of the container (e.g., refer to FIGS. 6 to 9).

The tourmaline granules (55) are not particularly limited in shape, size, number, and the like. The tourmaline granules are each usually polished tourmaline. In consideration of circulatory pressure (e.g., 0.3 MPa to 0.5 MPa) of cooling water, it is preferable that the tourmaline granules each have a particle diameter (maximum width) of 1 mm to 10 mm (particularly 3 mm to 5 mm). In addition, it is preferable that the tourmaline granules have a filling thickness (or a distance between the upstream partition wall and the downstream partition wall, facing each other) of 10 mm to 30 mm (particularly 10 mm to 20 mm) in the container.

Figure 9:
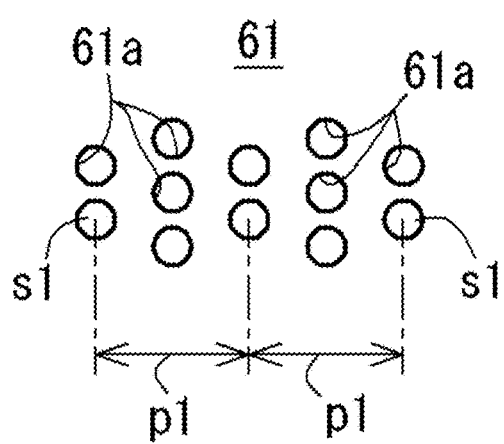
Figure 9:
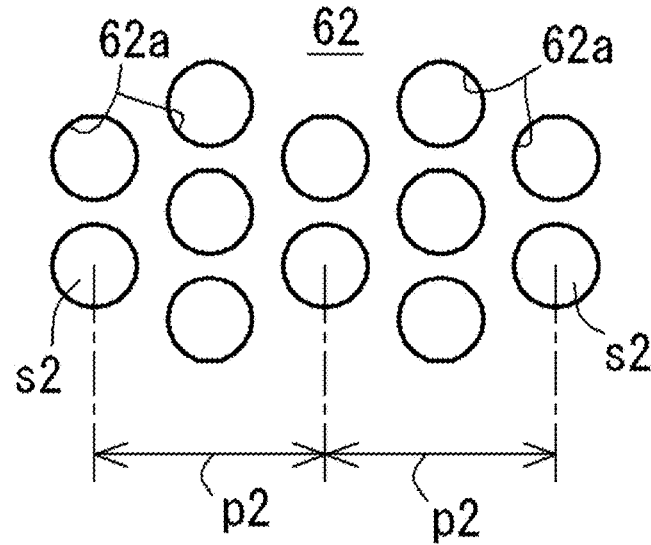

The tourmaline treatment device according to the present embodiment may include an aspect in which the flow velocity control means is configured by setting an opening area (s1) of each of the plurality of inflow holes (61a) to be smaller than an opening area (s2) of each of the plurality of outflow holes (62a), for example (e.g., refer to FIG. 9, etc.).

The aspect described above may have a ratio (s1/s2) of the opening area (s1) of each of the inflow holes (61a) to the opening area (s2) of each of the outflow holes (62a), the ratio being 0.1 to 0.6 (preferably 0.2 to 0.5), for example. The opening area (s1) of each of the inflow holes (61a) may be 0.5 mm² to 5 mm² (preferably 1 mm² to 3 mm²), for example. The opening area (s2) of each of the outflow holes (62a) may be 1 mm² to 10 mm² (preferably 3 mm² to 8 mm²), for example.

The tourmaline treatment device according to the present embodiment may include an aspect in which the flow velocity control means is configured by setting an opening rate (r1) of the plurality of inflow holes (61a) with respect to the upstream partition wall (61) to be smaller than an opening rate (r2) of the plurality of outflow holes (62a) with respect to the downstream partition wall (62), for example (e.g., refer to FIG. 9, etc.).

The aspect described above may have a ratio (r1/r2) of the opening rate (r1) of the inflow holes (61a) to the opening rate (r2) of the outflow holes (62a), the rate being 0.4 to 0.8 (preferably 0.5 to 0.7), for example. The opening rate above is intended to be a ratio of an opening area of each of the holes (61a and 62a) to a surface area of the corresponding one of the partition walls (61 and 62) on an upstream side (or an inflow side). The opening rate (r1) of the inflow holes (61a) may be 5% to 40% (preferably 10% to 30%), for example. The opening rate (r2) of the outflow holes (62a) may be 20% to 50% (preferably 25% to 45%), for example.

The tourmaline treatment device according to the present embodiment may include an aspect (e.g., refer to FIGS. 2 and 3, etc.) configured as follows: the housing (52) is formed in a cylindrical shape; the upstream partition wall (61) is formed in a cylindrical shape having a diameter smaller than that of the housing; the downstream partition wall (62) is formed in a cylindrical shape having a diameter not only smaller than that of the housing, but also larger than that of the upstream partition wall; and the upstream partition wall and the downstream partition wall are disposed in the housing such that their axes align with an axis of the housing, for example.

The tourmaline treatment device according to the present embodiment may include an aspect (e.g., refer to FIG. 6, etc.) in which the flow velocity control means is configured by setting a difference (d1−d2) between an inner diameter (d1) of the housing (52) and an outer diameter (d2) of the downstream partition wall (62) to be smaller than a difference (d3−d4) between an inner diameter (d3) of the downstream partition wall (62) and an outer diameter (d4) of the upstream partition wall (61), for example.

The aspect described above may have a ratio ((d1−d2)/(d3−d4)) of the difference (d1−d2) between the inner diameter (d1) of the housing (52) and the outer diameter (d2) of the downstream partition wall (62) to the difference (d3−d4) between the inner diameter (d3) of the downstream partition wall (62) and the outer diameter (d4) of the upstream partition wall (61), the ratio being 0.3 to 0.7 (preferably 0.4 to 0.6), for example. The difference (d1−d2) between the inner diameter (d1) of the housing (52) and the outer diameter (d2) of the downstream partition wall (62) may be 5 mm to 40 mm (preferably 10 mm to 30 mm), for example. The difference (d3−d4) between the inner diameter (d3) of the downstream partition wall (62) and the outer diameter (d4) of the upstream partition wall (61) may be 20 mm to 60 mm (preferably 30 mm to 50 mm), for example.

The tourmaline treatment device according to the present embodiment may include an aspect (e.g., refer to FIG. 4, etc.) in which the housing (52) includes a housing body (52a) in a bottomed cylindrical shape having an opening at one end side in its axial direction, in which the container (53) is disposed, and a lid (52b) detachably attached to the housing body so as to cover the opening of the housing body, for example.

The aspect described above may be configured such that the lid (52b) includes an air vent valve (58) for venting air in the housing (52), for example (e.g., refer to FIG. 3, etc.) As a result, air accumulation in the housing is eliminated, and cooling water smoothly flows in the housing.

<Cooling Water Circulation System>

Figure 1:
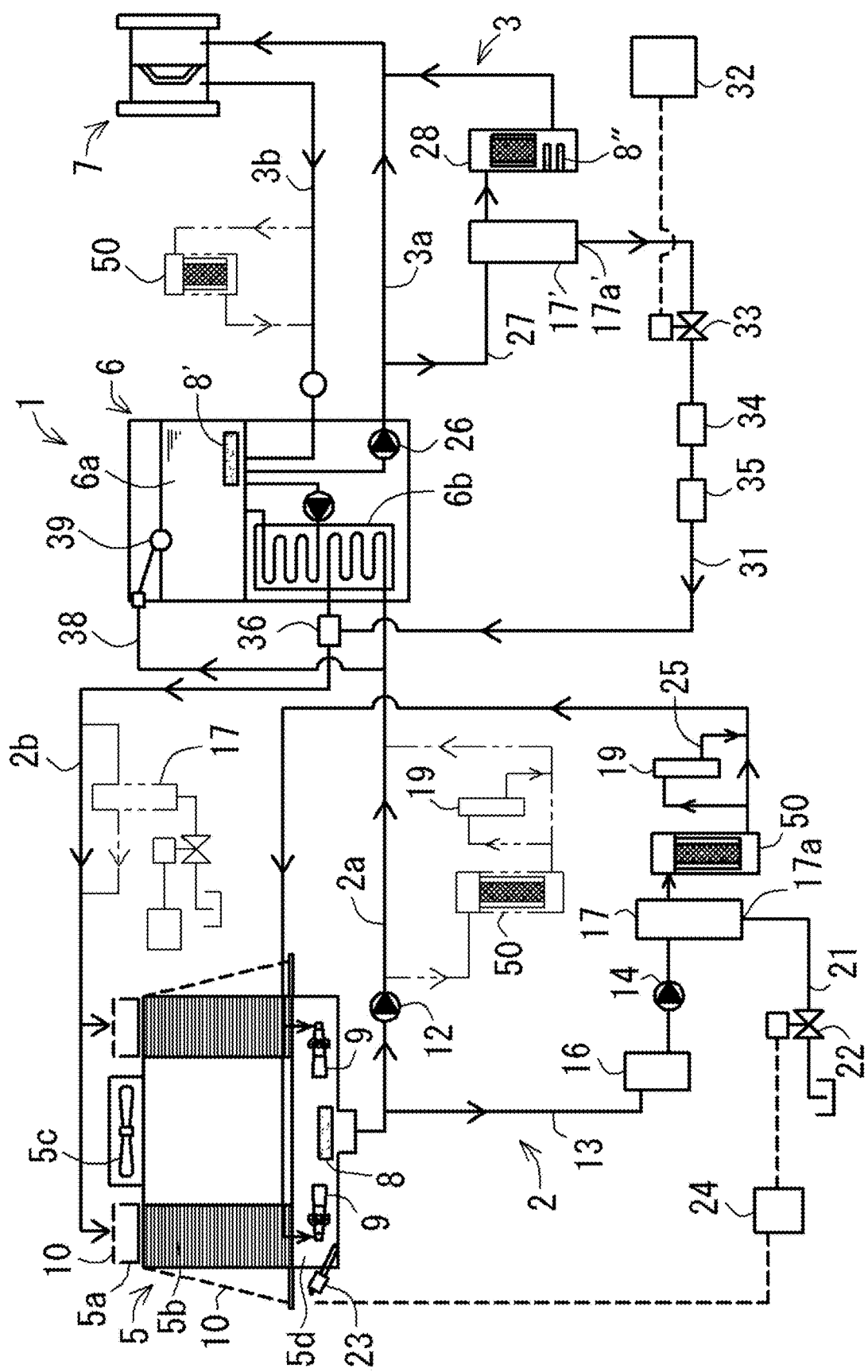
FIG. 1 is a general schematic view of a cooling water circulation system according to an example.

A cooling water circulation system according to the present embodiment is a cooling water circulation system (1) that circulates cooling water in each of circulation paths (2 and 3), and includes the tourmaline treatment device (50) according to the above embodiment (e.g., refer to FIG. 1, etc.). The circulation path may include at least one of a cooling-tower-side circulation path (2) for circulating the cooling water between a cooling tower (5) and a chiller machine (6), and a chiller-machine-side circulation path 3 for circulating the cooling water between the chiller machine (6) and a cooling target part (7).

The reference numeral in parentheses of each component described in the above embodiment indicates a correspondence with a specific component described in an example to be described below:

EXAMPLE

Hereinafter, the present invention will be described in detail using an example with reference to the drawings.

(1) Configuration of Cooling Water Circulation System

As illustrated in FIG. 1, a cooling water circulation system 1 according to the present example circulates cooling water in a circulation path, and includes a tourmaline treatment device 50 described below. The circulation path includes a cooling-tower-side circulation path 2 for circulating the cooling water between a cooling tower 5 and a chiller machine 6, and a chiller-machine-side circulation path 3 for circulating the cooling water between a chiller machine 6 and a cooling target part 7. Examples of the cooling target part 7 include an injection molding device, a press working device, a welding device, a heating device, a trimming device, and the like.

The cooling tower 5 includes a water sprinkling tank 5a for storing and sprinkling cooling water increased in temperature fed from the chiller machine 6, a filling material 5b for cooling the water sprinkled from the water sprinkling tank 5a with air, a blower 5c for taking in outside air through a suction port to allow the outside air to pass through the inside of the filling material 5b, and a water tank 5d for storing the cooling water dropped while being cooled by the filling material 5b. The water tank 5d is provided in its inside with a straight pipe 8 made of porous ceramic for generating microbubbles in cooling water by air supply using a compressor (not illustrated), and an injector 9 for removing precipitate precipitating on the bottom of the water tank 5d. In addition, a multifunctional net 10 is stretched so as to cover the suction port and the water sprinkling tank 5a of the cooling tower 5.

The chiller machine 6 includes a tank 6a for storing cooling water increased in temperature fed from the cooling target part 7, and a heat exchanger 6b for cooling the cooling water in the tank 6a. The tank 6a is provided in its inside with a straight pipe 8' made of a porous ceramic for generating microbubbles in cooling water by air supply using a compressor (not shown).

The cooling-tower-side circulation path 2 includes a feed path 2a that is connected at one end to the water tank 5d of the cooling tower 5 and at the other end to the heat exchanger 6b of the chiller machine 6, and a return path 2b that has one end connected to the heat exchanger 6b of the chiller machine 6 and the other end connected to the water sprinkling tank 5a of the cooling tower 5. The feed path 2a is provided with a pressure pump 12 for pumping the cooling water in the water tank 5d of the cooling tower 5 toward the heat exchanger 6b of the chiller machine 6. In addition, an introduction pipe 13 has one end connected to the injector 9 and the other end connected to the feed path 2a upstream of the pressure pump 12. The introduction pipe 13 is provided with a pressure feed pump 14 for pumping the cooling water in the water tank 5d of the cooling tower 5 toward the injector 9. Then, the injector 9 injects the cooling water pumped by the pressure pump 14 to remove precipitate precipitating on the bottom of the water tank 5d.

The introduction pipe 13 includes a basket filter 16 containing a water treatment agent made of an inorganic substance or the like, a water impurity separation device 17 for removing impurities contained in the cooling water, and a tourmaline treatment device 50 described below for treating the cooling water with tourmaline granules. The water impurity separation device 17 has a drain port 17a connected to a drain pipe 21 that is opened and closed by an on-off valve 22. The on-off valve 22 is controlled to be opened and closed by a control unit 24 in accordance with a detection value from a sensor 23 for detecting electric conductivity of cooling water. When the drain pipe 21 is opened, the cooling water is discharged together with impurities from the drain port 17a of the impurity separation device 17. The introduction pipe 13 is provided with a bypass path 25, and the bypass path 25 is provided with a magnetic water treatment device 19 for magnetically treating cooling water.

While the water impurity separation device 17 provided in the introduction pipe 13 is shown in the present example, the present invention is not limited to this. For example, the water impurity separation device 17 may be provided in the return path 2b (or the feed path 2a) of the cooling tower circulation path 2 instead of or in addition to the introduction pipe 13, as illustrated in FIG. 1 by an imaginary line.

The chiller-machine-side circulation path 3 includes a feed path 3a that has one end connected to the tank 6a of the chiller machine 6 and the other end connected to the cooling target part 7, and a return path 3b that has one end connected to the cooling target part 7 and the other end connected to the tank 6a of the chiller machine 6. The feed path 3a is provided with a pressure pump 26 for pumping cooling water in the tank 6a of the chiller machine 6 toward the cooling target part 7. In addition, a bypass path 27 is provided downstream of the pressure pump 26 in the feed path 3a. The bypass path 27 includes a water impurity separation device 17' for removing impurities contained in cooling water, and a microbubble generator 28 for generating microbubbles in cooling water.

The microbubble generator 28 is provided with a straight pipe 8" made of porous ceramic for generating microbubbles by air supply using a compressor (not illustrated), and has a configuration substantially equivalent to that of the tourmaline treatment device 50. Thus, the microbubble generator 28 also exerts a tourmaline treatment function of treating cooling water with tourmaline granules.

The cooling-tower-side circulation path 2 and the chiller-machine-side circulation path 3 are connected by a first connection pipe 31 for introducing cooling water circulating in the chiller-machine-side circulation path 3 into the cooling-tower-side circulation path 2. The first connection pipe 31 connects the return path 2b of the cooling-tower-side circulation path 2 to a drain port 17a' of the water impurity separation device 17'. The first connection pipe 31 is provided with an electric valve 33 of a ball valve type for opening and closing the first connection pipe 31 by opening and closing control of a control unit 32, a constant flow valve 34 of a washer rubber type, and a check valve 35 for preventing a reverse flow of cooling water. The electric valve 33 is controlled to be opened and closed with a timer function of the control unit 32. The first connection pipe 31 is provided at its one end with a differential pressure injector 36 disposed in a pipe constituting the cooling-tower-side circulation path 2.

The cooling-tower-side circulation path 2 and the chiller-machine-side circulation path 3 are connected by a second connection pipe 38 for introducing the cooling water circulating in the cooling-tower-side circulation path 2 to the chiller-machine-side circulation path. 3. The second connection pipe 38 connects the feed path 2a of the cooling-tower-side circulation path 2 and the tank 6a of the chiller machine 6. The second connection pipe 38 is provided at its one end with a float valve 39 for opening and closing the second connection pipe in accordance with vertical movement of the water surface in the tank 6a.

(2) Configuration of Tourmaline Treatment Device

As illustrated in FIGS. 2 and 3, the tourmaline treatment device 50 according to the present example includes a housing 52 in a cylindrical shape having an inflow port 51a and an outflow port 51b for cooling water, and a container 53 in a double cylindrical shape that is disposed in the housing 52 so as to divide the inside of the housing 52 into an upstream space S1 and a downstream space S2, and that contains tourmaline granules 55.

In the present example, a high purity tourmaline produced from a Brazilian mine is used as the tourmaline granules 55, and a raw stone of the tourmaline is polished with a rotating drum for grinding up to about ½ of the raw stone by weight to increase its hardness, thereby preventing crush of the tourmaline. In consideration of circulatory pressure (e.g., 0.3 MPa to 0.5 MPa) of cooling water, the tourmaline granules 55 each in an oval shape having a particle diameter of 3 mm to 5 mm are used.

Figure 4:
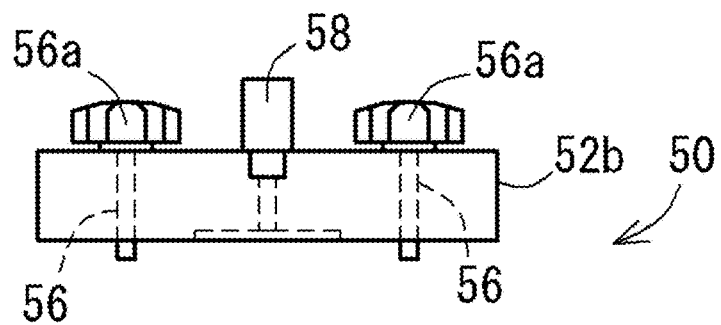
FIG. 4 is an explanatory view for illustrating a housing of the tourmaline treatment device.
Figure 4:
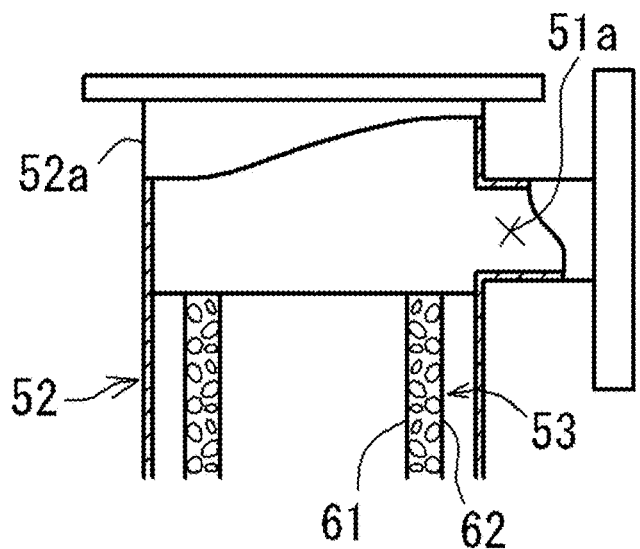

The housing 52 includes a housing body 52a in a bottomed cylindrical shape that has an opening at one end side in its axial direction (or at its upper end), and in which the container 53 is disposed, and a lid 52b detachably attached to the housing body 52a so as to cover the opening of the housing body 52a. The housing body 52a has a side wall provided in its upper portion with an inflow port 51a, and an outflow port 51b is provided in a lower portion of a side wall of the housing body 52a, facing the inflow port 51a. The inflow port 51a is provided so as to open while facing a space above the container 53. The outflow port 51b is provided so as to open while facing a side face of the container 53. As illustrated in FIG. 4, the lid 52b is detachable from the housing body 52a when a screw 56 is screwed into and released from the housing body 52a by being rotated while an operation part 56a is gripped. The lid 52b includes an air vent valve 58 for venting air in the housing 52.

Figure 5:
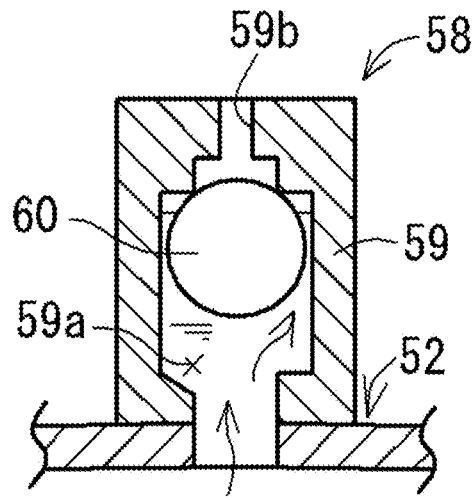
Figure 5:
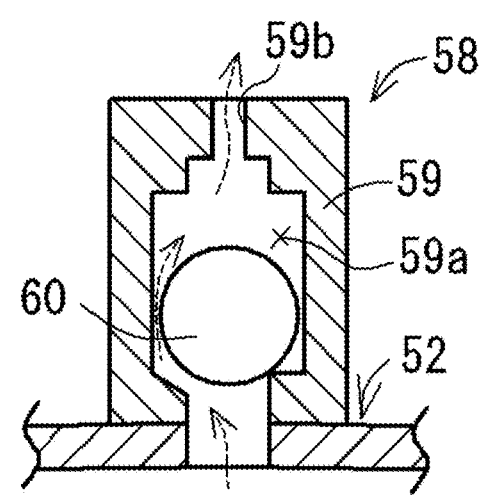

As illustrated in FIG. 5, the air vent valve 58 includes a casing 59 provided with a valve chamber 59a and an air vent hole 59b communicating with the valve chamber 59a, and a float 60 that is housed in the valve chamber 59a and moves up and down in accordance with vertical movement of the water surface of cooling water flowing into the valve chamber 59a. The air vent valve 58 regulates outflow of water to the outside in a manner such that the float 60 is raised by the cooling water flowing into the valve chamber 59*a* from the housing 52 and is seated on a valve seat to close the air vent hole 59*b* (refer to FIG. 5(*a*)). Meanwhile, when an inflow of the cooling water into the valve chamber 59*a* decreases, the float 60 descends and moves away from the valve seat, the air vent hole 59*b* is opened to release air generated in the housing 52 into the atmosphere (refer to FIG. 5(*b*)).

As illustrated in FIGS. 2 and 3, the container 53 includes an upstream partition wall 61 in a cylindrical shape facing the upstream space S1, and a downstream partition wall 62 in a cylindrical shape facing the downstream space S2. The upstream partition wall 61 is formed in a cylindrical shape having a diameter smaller than that of the housing 52. The downstream partition wall 62 is formed in a cylindrical shape having a diameter not only smaller than that of the housing 52, but also larger than that of the upstream partition wall 61. The upstream partition wall 61 and the downstream partition wall 62 are disposed in the housing 52 such that their axes align with an axis of the housing 52. The upstream partition wall 61 and the downstream partition wall 62 face each other, and the tourmaline granules 55 are contained in a space between the facing walls.

As illustrated in FIG. 3, the container 53 includes a bottom wall 63 that closes between lower ends of the respective upstream and downstream partition walls 61 and 62, and an upper wall 64 that closes between upper ends of the respective upstream and downstream partition walls 61 and 62. The bottom wall 63 is provided so as to close an inner peripheral side of the lower end of the upstream partition wall 61. The upper wall 64 is provided so as to open the inner peripheral side of the upper end of the upstream partition wall 61. In addition, the upper wall 64 extends to an outer peripheral side of the downstream partition wall 62 so as to be brought into contact with the side wall of the housing 52. The bottom wall 63 and the upper wall 64 are fixed to the partition walls 61 and 62 by caulking or the like. The container 53 divides the inside of the housing 52 into the upstream space S1 composed of a space inside the container 53 (or a space inside the upstream partition wall 61) and a space above the container 53, and the downstream space S2 composed of a space outside the container 53 (or a space outside the downstream partition wall 62) and a space below the container 53.

As illustrated in FIG. 3, the upper wall 64 is placed on a bracket 65 provided on the side wall of the housing 52. As a result, the container 53 is positioned in the housing 52, and can be put in and out the inside of a housing body 52*a* when a lid 52*b* is removed. The container 53 may contain a water treatment agent made of an inorganic material or the like on the inner peripheral side of the upstream partition wall 61.

Figure 6:
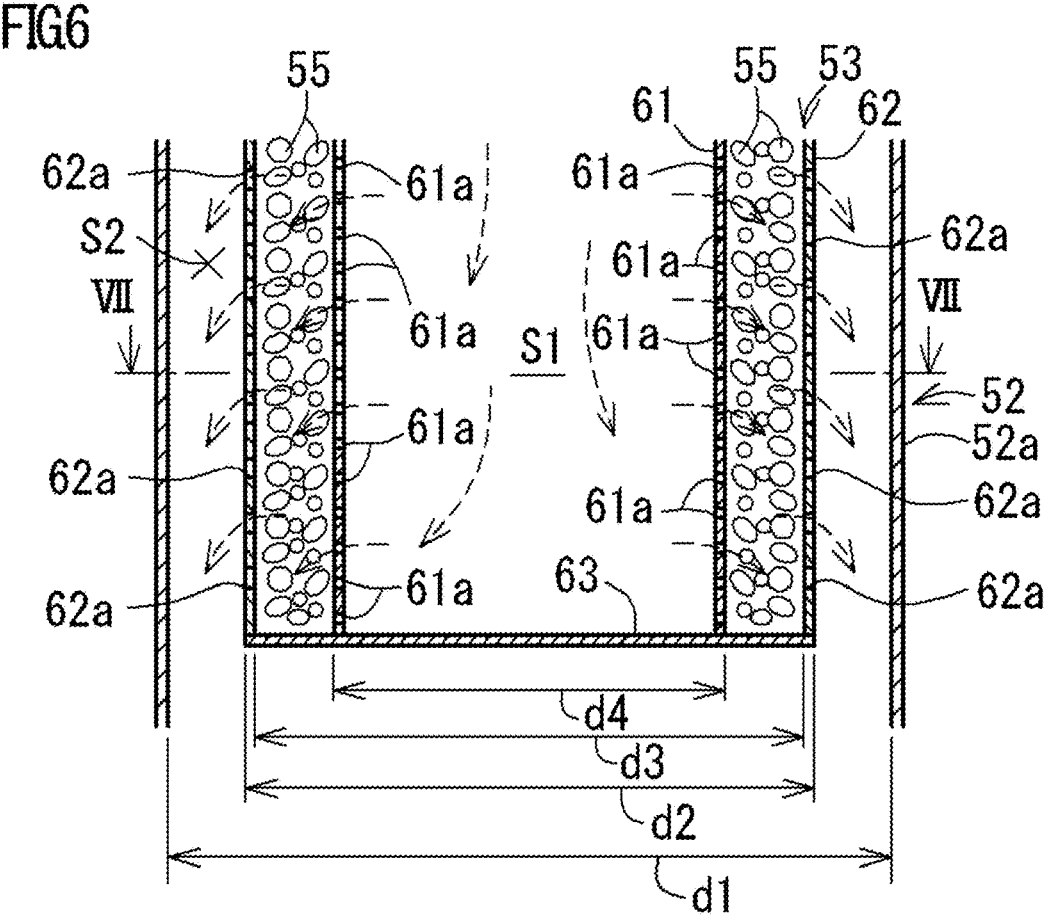
FIG. 6 is a view for illustrating action of the tourmaline treatment device.
Figure 8:
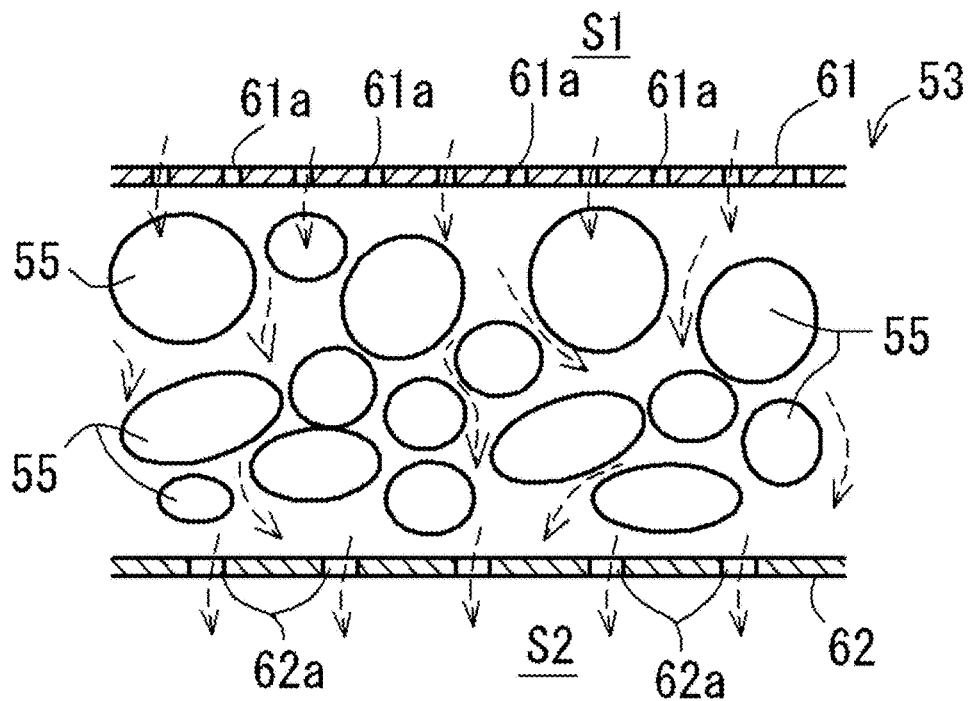
FIG. 8 is an enlarged view of a main part of FIG. 7.

As illustrated in FIG. 6, the upstream partition wall 61 is provided with a plurality of inflow holes 61*a* for allowing cooling water to flow into the container 53 from the upstream space S1. The upstream side partition wall 61 is formed by forming a stainless-steel plate (punching metal) with a plurality of circular inflow holes 61*a* formed by drilling in a cylindrical shape. As illustrated in FIGS. 8 and 9, each of the inflow holes 61*a* has a diameter of 1.5 mm and an opening area s1 of 1.8 mm$^2$, and a pitch p1 between adjacent inflow holes 61*a* (or a pitch p1 in a circumferential direction of the upstream partition wall 61) is 3 mm. In addition, an opening rate r1 of the plurality of inflow holes 61*a* with respect to a surface area of the upstream partition wall 61 on an upstream side (or an inflow side) is about 22.6%.

As illustrated in FIG. 6, the downstream partition wall 62 is provided with the plurality of outflow holes 62*a* for allowing the cooling water to flow out from the inside of the container 53 to the downstream space S2. The upstream side partition wall 62 is formed by forming a stainless-steel plate (punching metal) with a plurality of circular outflow holes 62*a* formed by drilling in a cylindrical shape. As illustrated in FIGS. 8 and 9, each of the outflow holes 62*a* has a diameter of 2.5 mm and an opening area s2 of 4.9 mm$^2$, and a pitch p2 between adjacent outflow holes 62*a* (or a pitch p2 in a circumferential direction of the downstream partition wall 62) is 4 mm. In addition, an opening rate r2 of the plurality of outflow holes 62*a* with respect to a surface area of the downstream partition wall 62 on the upstream side (or the inflow side) is about 35.4%.

As illustrated in FIG. 6, a difference (d1−d2) between an inner diameter d1 of the housing 52 and an outer diameter d2 of the downstream partition wall 62 is 20 mm. In addition, a difference (d3−d4) between an inner diameter d3 of the downstream side partition wall 62 and an outer diameter d4 of the upstream side partition wall 61 is 40 mm.

In the present example, the opening area s1 of each of the plurality of inflow holes 61*a* is set to a value smaller than the opening area s2 of each of the plurality of outflow holes 62*a*. As a result, the cooling water in the upstream space S1 passing through the inflow holes 61*a* each having the relatively small opening area s1 increases in flow velocity, and passes through the inside of the container 53 (or among the tourmaline granules 55), as illustrated in FIG. 8. The cooling water having passed through the inside of the container 53 passes through the outflow holes 62*a* each having the relatively large opening area s2 to reduce increase in pressure loss (or water flow resistance). For this reason, the "flow velocity control means" according to the present invention is configured by setting the opening areas s1 and s2 of the inflow holes 61*a* and the outflow holes 62*a* as described above.

In the present example, the opening rate r1 of the plurality of inflow holes 61*a* with respect to the upstream partition wall 61 is set to a value smaller than the opening rate r2 of the plurality of outflow holes 62*a* with respect to the downstream partition wall 62. As a result, the cooling water in the upstream space S1 passing through the inflow holes 61*a* having the relatively small opening rate r1 increases in flow velocity, and passes through the inside of the container 53 (or among the tourmaline granules 55), as illustrated in FIG. 8. The cooling water having passed through the inside of the container 53 passes through the outflow holes 62*a* having the relatively large opening rate r2 to reduce increase in pressure loss (or water flow resistance). For this reason, the "flow velocity control means" according to the present invention is configured by setting the opening rates r1 and r2 of the inflow holes 61*a* and the outflow holes 62*a* as described above.

In the present example, the difference (d1−d2) between the inner diameter dl of the housing 52 and the outer diameter d2 of the downstream partition wall 62 is set to a value smaller than the difference (d3−d4) between the inner diameter d3 of the downstream partition wall 62 and the outer diameter d4 of the upstream partition wall 61. As a result, the cooling water flowing downward in the downstream space S2 increases in flow velocity to increase the cooling water passing through the container 53 (or among the tourmaline granules 55) in flow velocity, as illustrated in FIG. 3. For this reason, the "flow velocity control means" according to the present invention is configured by setting the sizes of the housing 52, the upstream partition wall 61, and the downstream partition wall 62, as described above.

(3) Action of Cooling Water Circulation System

Next, action of the cooling water circulation system 1 having the above configuration will be described. As illustrated in FIG. 1, cooling water circulating in the cooling-tower-side circulation path 2 is improved in water quality not only when flowing through the introduction pipe 13 by action of the basket filter 16, the water impurity separation device 17, the tourmaline treatment device 50, and the magnetic water treatment device 19, but also when being stored in the water tank of the cooling tower by generation of microbubbles in the straight pipe 8 made of porous ceramic. This causes the cooling water to not only be excellent in rust prevention and scaling resistance, but also have a cleaning function. Meanwhile, cooling water circulating in the chiller-machine-side circulation path 3 is improved in water quality not only by action of the water impurity separation device 17' and the microbubble generator 28, but also by generation of microbubbles in the straight pipe 8 made of porous ceramic when being stored in the tank 6a of the chiller machine 6. This causes the cooling water to not only be excellent in rust prevention and scaling resistance, but also have a cleaning function.

Then, circulating the cooling water improved in water quality through the respective circulation paths 2 and 3 suppresses the following problems due to deterioration in water quality of cooling water: adhesion, deposition, and clogging of a flow channel, of scales; corrosion, rust, and water leakage; and occurrence of slime and algae, in a mold cooling hole, a cooling pipe, a heat exchanger, and the like. As a result, the following various merits can be obtained: stable quality of a molding (a mold can be maintained at a constant temperature, and a silver defect due to insufficient cooling is less likely to occur); power saving and energy saving (large reduction in power consumption by increase in a heat exchange rate of a heat exchanger, reduction in the amount of emission of $CO_2$ through power saving and water saving, and reduction of trouble about abnormal high pressure of a heat exchanger); and large reduction in facility management cost (reduction of electricity charges for facilities, reduction of chemical cleaning cost, and reduction of cleaning maintenance cost).

In addition, the cooling water circulation system 1 is configured such that when the electromagnetic valve 33 is opened by timer control of the control unit 32, cooling water together with impurities is introduced into the return path 2b of the cooling-tower-side circulation path 2 from the drain port 17a' of the water impurity separation device 17' via the first connection pipe 31. At this time, the differential pressure injector 36 injects cooling water (with a water pressure of 0.3 MPa, and at a flow rate of 1.8 L/min) flowing through the first connection pipe 31, lower in pressure than the cooling water (with a water pressure of 0.4 MPa, and at a flow rate of 120 L/min) flowing through a pipe constituting the cooling-tower-side circulation path 2, into the cooling water flowing through the pipe. Meanwhile, when the float valve 39 is operated in accordance with descent of the water surface of the tank 6a of the chiller machine 6, the cooling water flowing through the feed path 2a of the cooling-tower-side circulation path 2 is introduced to the tank 6a via the second connection pipe 38. That is, the cooling water contaminated in the chiller-machine-side circulation path 3 and the cooling water improved in water quality in the cooling-tower-side circulation path 2 are exchanged with each other.

Figure 7:
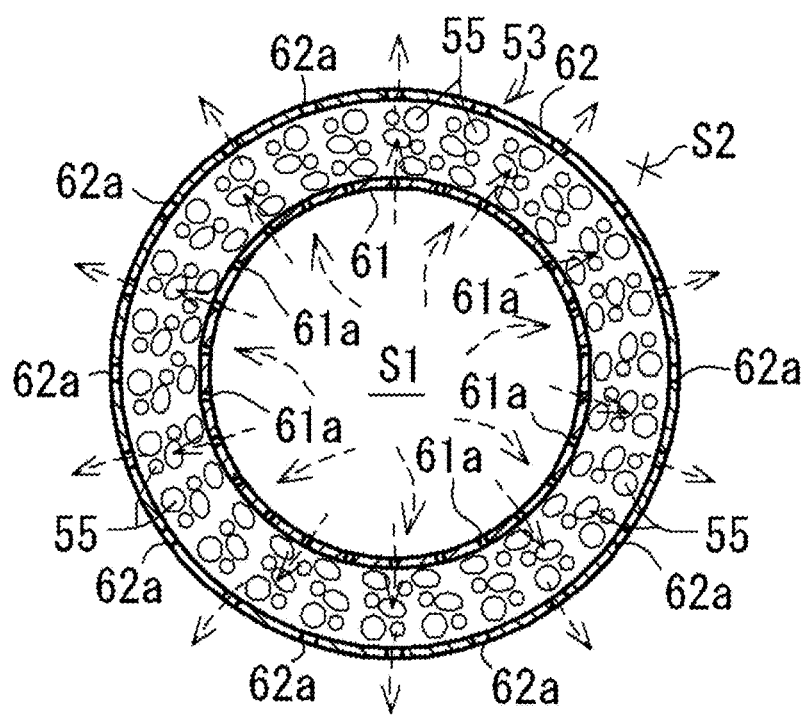
FIG. 7 is a sectional view taken along line VII-VII of FIG. 6.

As illustrated in FIG. 3, the tourmaline treatment device 50 according to the present example is configured such that cooling water flowing into the upstream space S1 in the housing 52 from the inflow port 51a flows into the container 53 through the plurality of inflow holes 61a of the upstream partition wall 61, and passes through the inside of the container 53, or among the tourmaline granules 55, toward a centrifugal side (refer to FIGS. 6 to 8). At this time, the flow velocity control means increases the flow velocity of the cooling water passing through the inside of the container 53. Thus, the cooling water is brought into contact with the tourmaline granules 55 with a strong pressure and impact, so that the piezoelectric effect being the characteristic of the tourmaline is developed to efficiently produce useful tourmaline-treated water. The cooling water (tourmaline-treated water) having passed through the inside of the container 53 flows out from the plurality of outflow holes 62a of the downstream partition wall 62 into the downstream space S2 in the housing 52, and hits the side wall of the housing 52 to flow downward in the downstream space S2, thereby flowing out from the outflow port 51b to the outside when reaching the bottom of the housing 52.

Figure 10:
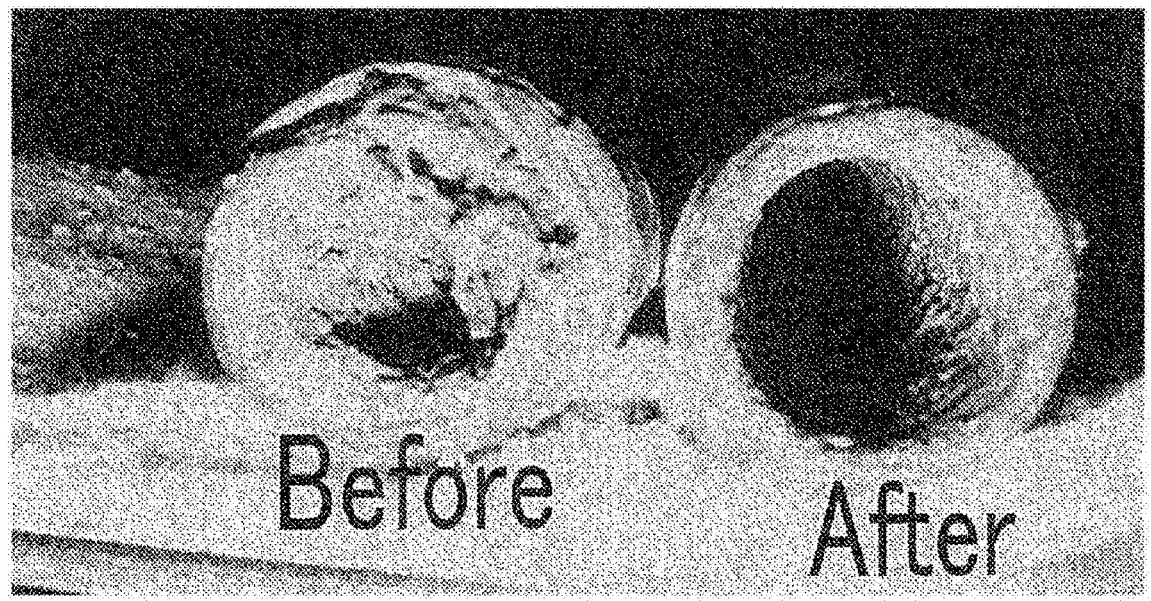
FIG. 10 is an explanatory view for illustrating an experimental result of the tourmaline treatment device.

Here, an experimental example using the tourmaline treatment device 50 will be described. In the present experimental example, a pipe with corrosion (laying pipe for supplying cooling water to a cooling hole of a mold of a molding machine) was prepared and the tourmaline treatment device 50 was operated at an amount of 100 L/min of circulating water for 300 hours. As a result, it was found that a state of the pipe was changed from a state where corrosion was attached to the pipe (indicated by "Before") to a state where the corrosion was removed from the pipe (indicated by "After"), as illustrated in FIG. 10. In addition, as a dustproof effect evaluation experiment of tourmaline, a stainless-steel nipple, a cast iron nipple, and a tourmaline (polished stone having a particle diameter of 3 mm to 5 mm) were contained in a one-liter glass container for three years or more. As a result, it was found that no corrosion (rust) occurred in the cast iron nipple.

(4) Effect of Example

The tourmaline treatment device 50 of the present example includes the housing 52 having the inflow port 51a and the outflow port 51b for cooling water, and the container 53 disposed in the housing 52 so as to partition the inside of the housing 52 into the upstream space S1 and the downstream space S2 and contain a large number of tourmaline granules 55. The container 53 includes the upstream partition wall 61 facing the upstream space S1 and the downstream partition wall 62 facing the downstream space S2. The upstream partition wall 61 is provided with the plurality of inflow holes 61a for allowing cooling water to flow into the container 53 from the upstream space S1, and the downstream partition wall 62 is provided with the plurality of outflow holes 62a for allowing the cooling water to flow out from the inside of the container 53 into the downstream space S2. The container 53 further includes the flow velocity control means for increasing flow velocity of cooling water passing through the inside of the container 53. This causes the cooling water flowing into the upstream space S1 in the housing 52 from the inflow port 51a to flow into the container 53 through the plurality of inflow holes 61a of the upstream partition wall 61 to pass through the inside of the container 53, or among the tourmaline granules 55. At this time, the flow velocity control means increases the flow velocity of the cooling water passing through the inside of the container 53. Thus, the cooling water is brought into contact with the tourmaline granules 55 with a strong pressure and impact, so that the piezoelectric effect being the characteristic of the tourmaline is developed to efficiently produce useful tourmaline-treated water. Then, the cooling water having passed through the inside of the container 53 flows out from the plurality of outflow holes 62*a* of the downstream partition wall 62 into the downstream space S2 in the housing 52 to flow out to the outside of the housing 52 through the outflow port 51*b*.

In the present example, the flow velocity control means is configured by setting the opening area s1 of each of the plurality of inflow holes 61*a* to be smaller than the opening area s2 of each of the plurality of outflow holes 62*a*. As a result, the cooling water in the upstream space S1 passing through the inflow holes 61*a* each having the relatively small opening area s1 increases in flow velocity, and passes through the inside of the container 53. The cooling water having passed through the inside of the container 53 passes through the outflow holes 62*a* each having the relatively large opening area s2 to reduce increase in pressure loss.

In the present example, the flow velocity control means is configured by setting the opening rate r1 of the plurality of inflow holes 61*a* with respect to the upstream side partition wall 61 to be smaller than the opening rate r2 of the plurality of outflow holes 62*a* with respect to the downstream side partition wall 62. As a result, the cooling water in the upstream space S1 passing through the inflow holes 61*a* having the relatively small opening rate r1 increases in flow velocity, and passes through the inside of the container 53. The cooling water having passed through the inside of the container 53 passes through the outflow holes 62*a* having the relatively large opening rate r2 to reduce increase in pressure loss.

The present example is configured as follows: the housing 52 is formed in a cylindrical shape; the upstream partition wall 61 is formed in a cylindrical shape having a diameter smaller than that of the housing 52; the downstream partition wall 62 is formed in a cylindrical shape having a diameter not only smaller than that of the housing 52, but also larger than that of the upstream partition wall 61; and the upstream partition wall 61 and the downstream partition wall 62 are disposed in the housing 52 such that their axes align with an axis of the housing 52. As a result, the cooling water flowing into the upstream space S1 in the container 53 on its inner peripheral side passes through the inflow holes 61*a* to flow inside the container 53 toward the centrifugal side. The cooling water having passed through the inside of the container 53 flows through the outflow holes 62*a* to flow out into the downstream space S2 in the container 53 on its outer peripheral side, and then hits the side wall of the housing 52 to flow downward in the downstream space S2. This enables the cooling water to be brought into contact with the tourmaline granules 55 with higher pressure and impact.

In the present example, the flow velocity control means is configured by setting the difference (d1–d2) between the inner diameter d1 of the housing 52 and the outer diameter d2 of the downstream partition wall 62 to be smaller than the difference (d3–d4) between the inner diameter d3 of the downstream partition wall 62 and the outer diameter d4 of the upstream partition wall 61. As a result, the cooling water flowing downward in the downstream space S2 increases in flow velocity to increase the cooling water passing through the inside of the container 53 in flow velocity.

In the present example, the housing 52 includes the housing body 52*a* in a bottomed cylindrical shape, and the lid 52*b* detachably attached to the housing body 52*a*. Accordingly, detaching the lid 52*b* from the housing body 52*a* enables the inside of the housing 52 to be easily cleaned and checked, for example.

Furthermore, in the present example, the lid 52*b* is provided with the air vent valve 58 for venting air in the housing 52. As a result, air accumulation in the housing 52 is eliminated, and cooling water smoothly flows in the housing 52.

The cooling water circulation system 1 of the present example includes the tourmaline treatment device 50 described above. This enables useful tourmaline-treated water to be efficiently produced by bringing the cooling water into contact with the tourmaline granules 55 with high pressure and impact. Circulating cooling water improved in water quality through the circulation paths 2 and 3 enables not only contamination and clogging of the circulation paths 2 and 3 to be prevented, but also the water quality of the cooling water to be maintained.

Figure 11:
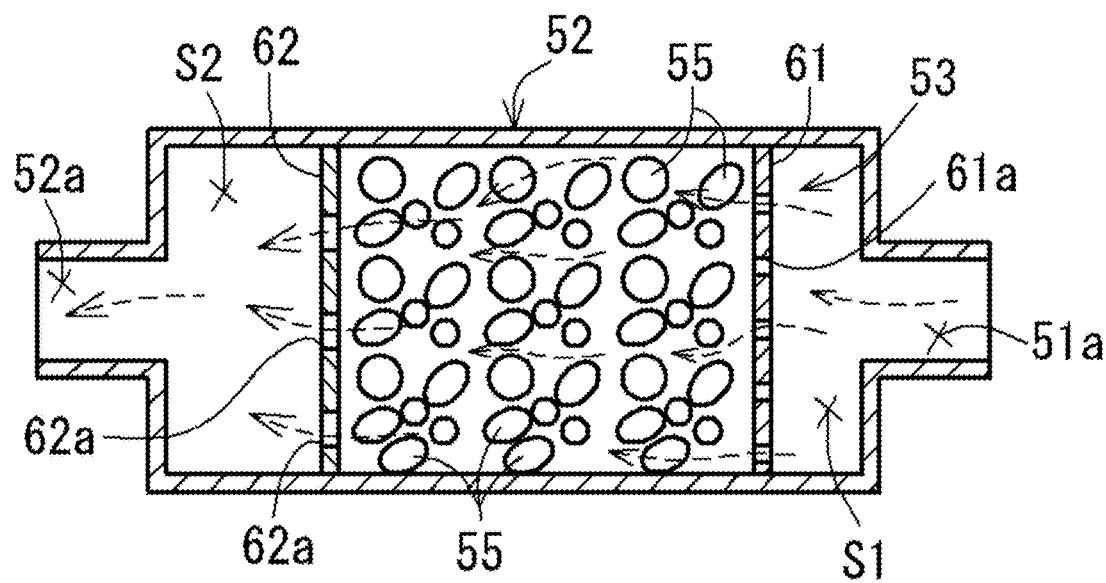
FIG. 11 is an explanatory view for illustrating a tourmaline treatment device of another aspect.

The present invention is not limited to the example described above, and can be variously modified within the scope of the present invention depending on purpose and use. That is, while the aspect of containing a large number of tourmaline granules 55 in the space between the cylindrical upstream and downstream partition walls 61 and 62 facing each other is shown in the example above, the present invention is not limited to this. For example, a large number of tourmaline granules 55 may be contained in a space between plate-like upstream and downstream partition walls 61 and 62 facing each other, as illustrated in FIG. 11.

While the "flow velocity control means" according to the present invention is shown in the example above as the aspect of combination of: the specific setting of the opening areas s1 and s2 of the inflow hole 61*a* and the outflow hole 62*a*; the specific setting of the opening rates r1 and r2 of the inflow holes 61*a* and the outflow holes 62*a*; and the specific setting of the sizes of the housing 52, the upstream partition wall 61, and the downstream partition wall 62, the present invention is not limited to this. For example, the flow velocity control means may be composed of one type of the above three types of specific setting, or a combination of two types thereof. In addition to or in place of the above-described three types of specific setting, the flow velocity control means may include another specific setting (e.g., specific shapes and specific structures of the inflow port 51*a* and the outflow port 51*b*, etc.).

While the tourmaline treatment device 50 provided in the introduction pipe 13 is shown in the example above, the present invention is not limited to this. For example, the tourmaline treatment device 50 may be provided in the feed path 2*a* (or the return path 2*b*) of the cooling-tower-side circulation path 2 instead of or in addition to the introduction pipe 13, as illustrated in FIG. 1 by an imaginary line. In addition, the tourmaline treatment device 50 may be provided in the return path 3*b* (or the feed path 3*a*) of the chiller-machine-side circulation path 3.

While the example above shows the inflow hole 61*a* and the outflow hole 62*a* each in a circular shape, the present invention is not limited to this. For example, the inflow hole and the outflow hole each may be formed in a rectangular shape, an elliptical shape, an odd-shape, or the like.

While the example described above shows the air vent valve 58 of a float type, the present invention is not limited to this. For example, an air vent valve of another type such as a pressure actuated type may be used.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

INDUSTRIAL APPLICABILITY

The present invention is widely used as a technique for converting cooling water used in plant facilities and the like into tourmaline-treated water.

REFERENCE SIGNS LIST 1 cooling water circulation system
2 cooling-tower-side circulation path
3 chiller-machine-side circulation path
50 tourmaline treatment device
51a inflow port
51b outflow port
52 housing
52a housing body
52b lid
53 container
55 tourmaline granules
61 upstream partition wall
61a inflow hole
62 downstream partition wall
62a outflow hole
s1, s2 opening area
r1, r2 opening rate
d1 inner diameter of housing
d2 outer diameter of downstream partition wall
d3 inner diameter of downstream partition wall
d4 outer diameter of upstream partition wall
S1 upstream space
S2 downstream space

The invention claimed is:

1. A tourmaline treatment device provided in a circulation path of cooling water, the tourmaline treatment device comprising:
a housing having an inflow port and an outflow port for cooling water, the outflow port being below the inflow port; and
a container disposed in the housing so as to partition the inside of the housing into an upstream space and a downstream space and contain tourmaline granules,
the container including an upstream partition wall facing the upstream space and a downstream partition wall facing the downstream space, each of the upstream partition wall and the downstream partition wall being vertically positioned,
the upstream partition wall being provided with a plurality of inflow holes for introducing cooling water into the container from the upstream space,
the downstream partition wall being provided with a plurality of outflow holes for allowing cooling water to flow out from the container into the downstream space,
wherein the container is structured and arranged to increase flow velocity of cooling water passing through the inside of the container, and
wherein the container is structured to increase the flow velocity by setting an opening area of each of the plurality of inflow holes to be smaller than an opening area of each of the plurality of outflow holes.

2. A tourmaline treatment device provided in a circulation path of cooling water, the tourmaline treatment device comprising:
a housing having an inflow port and an outflow port for cooling water, the outflow port being below the inflow port; and
a container disposed in the housing so as to partition the inside of the housing into an upstream space and a downstream space and contain tourmaline granules,
the container including an upstream partition wall facing the upstream space and a downstream partition wall facing the downstream space, each of the upstream partition wall and the downstream partition wall being vertically positioned,
the upstream partition wall being provided with a plurality of inflow holes for introducing cooling water into the container from the upstream space,
the downstream partition wall being provided with a plurality of outflow holes for allowing cooling water to flow out from the container into the downstream space,
wherein the container is structured and arranged to increase flow velocity of cooling water passing through the inside of the container, and
wherein the container is structured to increase the flow velocity by setting an opening rate of the plurality of inflow holes with respect to the upstream side partition wall to be smaller than an opening rate of the plurality of outflow holes with respect to the downstream side partition wall.

3. A tourmaline treatment device provided in a circulation path of cooling water, the tourmaline treatment device comprising:
a housing having an inflow port and an outflow port for cooling water, the outflow port being below the inflow port; and
a container disposed in the housing so as to partition the inside of the housing into an upstream space and a downstream space and contain tourmaline granules,
the container including an upstream partition wall facing the upstream space and a downstream partition wall facing the downstream space, each of the upstream partition wall and the downstream partition wall being vertically positioned,
the upstream partition wall being provided with a plurality of inflow holes for introducing cooling water into the container from the upstream space,
the downstream partition wall being provided with a plurality of outflow holes for allowing cooling water to flow out from the container into the downstream space,
wherein the container and housing are structured and arranged to increase flow velocity of cooling water passing through the inside of the container, and
wherein:
the housing is formed in a cylindrical shape,
the upstream partition wall is formed in a cylindrical shape having a diameter smaller than that of the housing, the downstream partition wall is formed in a cylindrical shape having a diameter not only smaller than that of the housing, but also larger than that of the upstream partition wall, and the upstream partition wall and the downstream partition wall are disposed in the housing such that their axes align with an axis of the housing.

4. The tourmaline treatment device according to claim 3, wherein the increase of the flow velocity is configured by setting a difference between an inner diameter of the housing and an outer diameter of the downstream partition wall to be smaller than a difference between an inner diameter of the downstream partition wall and an outer diameter of the upstream partition wall.

5. The tourmaline treatment device according to claim 1, wherein the housing includes a housing body in a bottomed cylindrical shape that has an opening at one end side in its axial direction and in which the container is disposed, and a lid detachably attached to the housing body so as to cover the opening of the housing body.

6. A cooling water circulation system for circulating cooling water in a circulation path, comprising:

the tourmaline treatment device according to claim 1.

* * * * *